United States Patent [19]

Baron et al.

[11] Patent Number: 5,277,888
[45] Date of Patent: Jan. 11, 1994

[54] DISPERSIONS OF SPHERICAL INORGANIC PARTICLES

[75] Inventors: Wilfried Baron, Rossdorf; Martin Knapp, Dieburg; Kurt Marquard, Reinheim, all of Fed. Rep. of Germany

[73] Assignee: Merck Patent Gesellschaft Beschränkter Haftung, Darmstadt, Fed. Rep. of Germany

[21] Appl. No.: 793,433
[22] PCT Filed: Jun. 8, 1990
[86] PCT No.: PCT/EP90/00896
§ 371 Date: Dec. 16, 1991
§ 102(e) Date: Dec. 16, 1991
[87] PCT Pub. No.: WO90/15849
PCT Pub. Date: Dec. 27, 1990

[30] Foreign Application Priority Data

Jun. 19, 1989 [DE] Fed. Rep. of Germany ....... 3919940

[51] Int. Cl.$^5$ .................. C09D 17/00; C01B 33/18
[52] U.S. Cl. ..................................... 423/335; 423/69; 106/491; 252/315.2; 252/315.6
[58] Field of Search ............. 252/315.2, 315.6; 106/287.34, 491; 423/335, 338, 339, 69

[56] References Cited

U.S. PATENT DOCUMENTS

| | | | |
|---|---|---|---|
| 4,038,224 | 7/1977 | Eisenmenger et al. | 106/491 |
| 4,173,491 | 11/1979 | Abrams et al. | 106/491 |
| 4,711,916 | 12/1987 | Hagiwara et al. | 523/223 |
| 5,028,267 | 7/1991 | Lane et al. | 106/287.1 |
| 5,034,207 | 7/1991 | Kerner et al. | 423/339 |

FOREIGN PATENT DOCUMENTS

| | | | |
|---|---|---|---|
| 60-072814 | 4/1985 | Japan . | |
| 2041956 | 9/1980 | United Kingdom | 106/287.34 |

Primary Examiner—Robert Kunemund
Assistant Examiner—Ken Horton
Attorney, Agent, or Firm—Millen, White, Zelano & Branigan

[57] ABSTRACT

The invention relates to dispersions of spherical inorganic particles, organic dispersing media having solidification points in the range of 20°–120° C. being used as dispersants.

9 Claims, No Drawings

DISPERSIONS OF SPHERICAL INORGANIC PARTICLES

SUMMARY OF THE INVENTION

The invention relates to dispersions of spherical inorganic particles which are stable and agglomerate-free.

Fine, spherical inorganic particles, such as, for example, $TiO_2$ or $ZrO_2$ particles, and in particular spherical $SiO_2$ particles, are of particular interest, being valuable auxiliaries in the industrial and scientific area and interesting, scientific study objects, as well as carrier material in chromatography.

Some fields of use of such nonporous, spherical $SiO_2$ particles are described in, for example, German Offenlegungsschrift 3,616,133. The preparation of such monodisperse, spherical $SiO_2$ particles is described in German Offenlegungsschrift 3,616,133. The corresponding $TiO_2$ or $ZrO_2$ particles can likewise be prepared by methods known to the person skilled in the art and are also commercially available.

For all applications, the particles are required to be present in a highly monodisperse form and without agglomerates. However, it has been found that the dispersions of such spherical particles in the usual dispersing media, such as alcohols, especially, for example, ethylene glycol, are not sufficiently stable.

Especially in the case of particles having a diameter >500 nm, the dispersions known to date with ethylene glycol or other alcohols are not stable. The settling rate is dependent on the particle diameter and even particles having sphere diameters of, for example, 0.5 $\mu$m, 1.0 $\mu$m, 1.2 $\mu$m or 1.5 $\mu$m settle out very rapidly and form agglomerates. However, such dispersions are unsuitable for most applications.

It was therefore the object of the present invention to find dispersions of spherical inorganic particles which contain the fine particles in an ideally distributed and agglomerate-free form, and which are also stable where relatively large diameters of the particles are present.

It has now been found, surprisingly, that organic dispersing media which are viscous or solid at room temperature are outstandingly suitable as dispersants for such spherical particles.

The invention therefore relates to dispersions of spherical inorganic particles, characterized in that organic dispersing media having solidification points in the range of 200°-120° C. are used as dispersants. Dispersions of spherical $SiO_2$, $TiO_2$ or $ZrO_2$ particles are particularly preferred. The particle size is preferably between 0.05 and 10 $\mu$m.

Polyethers, polyalkylene glycols, paraffins, resins, waxes, vinyl polymers, polysiloxanes, polyolefins, polyamides or the like, as well as copolymers, such as, for example, a copolymer of polyethylene waxes and vinyl acetate, can preferably be used as organic dispersing media.

Critical parameters for the suitability of a dispersing medium are the polarity and solidification points, and, associated therewith, also the molecular weight. The polarity can be influenced by the chemical composition of the organic dispersing medium.

For the preparation of stable dispersions, it is of course advantageous to choose a dispersant which has a polarity similar to that of the particles to be dispersed. Thus, for example, dispersants of relatively high polarity are preferably chosen for the more hydrophilic $SiO_2$ particles. On the other hand, corresponding nonpolar dispersants are more suitable for modified $SiO_2$ particles (the preparation and description of such modified $SiO_2$ particles are to be found in German Offenlegungsschrift 3,616,133), which may have a hydrophobic character. This also applies to the $ZrO_2$ and $TiO_2$ particles. This means that the dispersing medium must be chosen so that good compatibility with the particles is ensured.

The most important parameter is the solidification point of the dispersing medium. In order to obtain a dispersion according to the invention, the solidification point must be between 20° and 120° C., preferably between 30° and 70° C. This means that the dispersion is viscous or solid at room temperature. The ideal distribution of the particles then remains unchanged and stable after solidification of the material.

The molecular weight of the dispersant varies from a few hundred to a few hundred thousand. It is preferably between 300 and 50,000.

The dispersions are prepared after the synthesis of the corresponding particles, by dispersing the prepared particles in a selected agent at elevated temperature. The ideal distribution of the particles remains stable and unchanged after cooling, since this ideal state having a high degree of dispersion is virtually frozen on solidification of the material.

Polyethylene glycols having a softening temperature of 30°-120° C., preferably of 30°-70° C., which are relatively viscous or solid at room temperature, are particularly preferably used.

A suitable polyethylene glycol can be chosen according to the intended use. Liquid polyethylene glycols can also be used.

The advantages of these dispersions are the solubility of the polyethylene glycol in many solvents, including water, and the compatibility with the inorganic particles.

The stable dispersions assume the properties of the polyethylene glycol and contain the spherical particles in an ideally distributed and agglomerate-free form.

The concentration of solids in the dispersions according to the invention can likewise be chosen according to the use and is 1%-50%, preferably 20-50%.

The dispersions according to the invention can be remelted and poured and thus converted into a form which is easy to handle. The dispersions can thus, for example, also be readily weighed in and weighed out.

This invention thus provides industry and science with excellent dispersions of spherical particles, in particular spherical $SiO_2$ particles, which may also be modified, which are stable and in which the state having a high degree of dispersion is frozen, for a very wide range of intended uses.

EXAMPLES

Example 1

270 g of polyethylene glycol PEG 1000 (average molecular weight about 1,000) are placed in a rotary evaporator. At a temperature of 70°-90° C. and a pressure of about 30 mmHg, a suspension of 180 g of $SiO_2$ particles in alcohol/water is drawn in portions into the rotary evaporator (directly from the preparation of the $SiO_2$ particles analogously to the manner described in German Offenlegungsschrift 3,616,133) and at the same time the solvent water/alcohol is distilled off.

After the total solvent has been distilled off, about 450 g of melt containing 40% of solid, which is homogeneously distributed in the melt, remain.

The melt is poured out and allowed to solidify, and a stable dispersion which can be used for any purpose is thus obtained.

Example 2

Dispersions containing ZrO$_2$ or TiO$_2$ particles in polyethylene glycol 1000 are obtained analogously to Example 1.

Example 3

A stable dispersion of octyltriethoxysilane-modified SiO$_2$ particles in a paraffin having a solidification point of 42°–44° C. is obtained analogously to Example 1.

Example 4

A stable dispersion of dodecyltriethoxysilane-modified SiO$_2$ particles in a paraffin having a solidification point of 69°–73° C. is obtained analogously to Example 3.

We claim:

1. A dispersion of inorganic particles comprising:
   spherical SiO$_2$, TiO$_2$ or ZrO$_2$ particles having particle diameters of 0.05–10 μm and
   an organic dispersing medium, in which said particles are dispersed, wherein said dispersing medium is a polyalkylene glycol having a softening temperature of 30°–70° C.,
   wherein said dispersion is stable.

2. A dispersion according to claim 1, wherein the concentration of inorganic particles is 1–50%.

3. A dispersion according to claim 1, wherein the molecular weight of said dispersing medium is 300–50,000.

4. A dispersion according to claim 1, wherein said spherical particles are octyltriethoxysilane-modified SiO$_2$ particles or dodecyltriethoxysilane-modified SiO$_2$ particles.

5. A dispersion according to claim 1, wherein said dispersing medium is polyethylene glycol 1000.

6. A dispersion according claim 1, wherein said dispersing medium is a polyethylene glycol.

7. A dispersion according to claim 2, wherein the concentration of inorganic particles is 20–50%.

8. A dispersion of inorganic particles comprising:
   spherical SiO$_2$, TiO$_2$ or ZrO$_2$ particles having particle diameters of 0.05–10 μm, and
   an organic dispersing medium, in which said particles are dispersed, wherein said dispersing medium is a polyalkylene glycol having a softening temperature of 30°–70° C.,
   wherein said dispersion is viscous or solid at room temperature and, upon solidification, distribution of the particles within the dispersing medium remains stable.

9. A dispersion of inorganic particles comprising:
   spherical SiO$_2$, TiO$_2$ or ZrO$_2$ particles having particle diameters of 0.05–10 μm, and
   an organic dispersing medium, in which said particles are dispersed, wherein said dispersing medium is a polyalkylene glycol having a softening temperature of 30°–70° C.,
   wherein said spherical particles are ideally distributed within the dispersing medium and are in agglomerate-free form.

* * * * *